(12) United States Patent
Thomas

(10) Patent No.: US 6,584,529 B1
(45) Date of Patent: Jun. 24, 2003

(54) INTERMEDIATE BUFFER CONTROL FOR IMPROVING THROUGHPUT OF SPLIT TRANSACTION INTERCONNECT

(75) Inventor: Reji Thomas, Fremont, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 382 days.

(21) Appl. No.: 09/657,832

(22) Filed: Sep. 8, 2000

(51) Int. Cl.[7] .......... G06F 3/00; G06F 13/14; G06F 13/00; H04N 1/21
(52) U.S. Cl. .......... 710/240; 710/39; 710/52; 370/429
(58) Field of Search .......... 710/240, 52, 56, 710/100, 1, 39, 62; 711/147; 714/47; 712/32; 358/444; 370/412, 423, 429, 229, 447, 395.71; 345/418, 541

(56) References Cited

U.S. PATENT DOCUMENTS 4,933,840 A * 6/1990 Sera et al.
5,239,387 A * 8/1993 Stein et al.
5,892,964 A * 4/1999 Horan et al.
6,195,331 B1 * 2/2001 Tani
6,457,077 B1 * 9/2002 Kelley et al.

OTHER PUBLICATIONS

*Accelerated Graphics Port Interface Specification*, Chapters 1–3 and 6, Revision 2.0, Intel Corporation, (May 4, 1998), pp. 1–153 and 243–259.

* cited by examiner

Primary Examiner—Gopal C. Ray
(74) Attorney, Agent, or Firm—Peter Zawilski

(57) ABSTRACT

A circuit arrangement, apparatus and method control the transfer of data into an intermediate buffer associated with a split transaction bus by conditioning such transfer on both the amount of free space in the intermediate buffer and whether a data transfer request associated with such transfer of data is ready to be processed at a shared resource that is the target for the data transfer request. In an example embodiment, data transfer requests represent AGP write transactions to a shared memory, and control logic for an intermediate buffer used to store the write data associated with such transactions is configured to selectively inhibit the storage of write data associated with an AGP write transaction unless both at least one block of free space (representing the minimum amount of space necessary to start the write transaction) exists in the intermediate buffer, and the shared memory is ready to process the transaction.

19 Claims, 2 Drawing Sheets

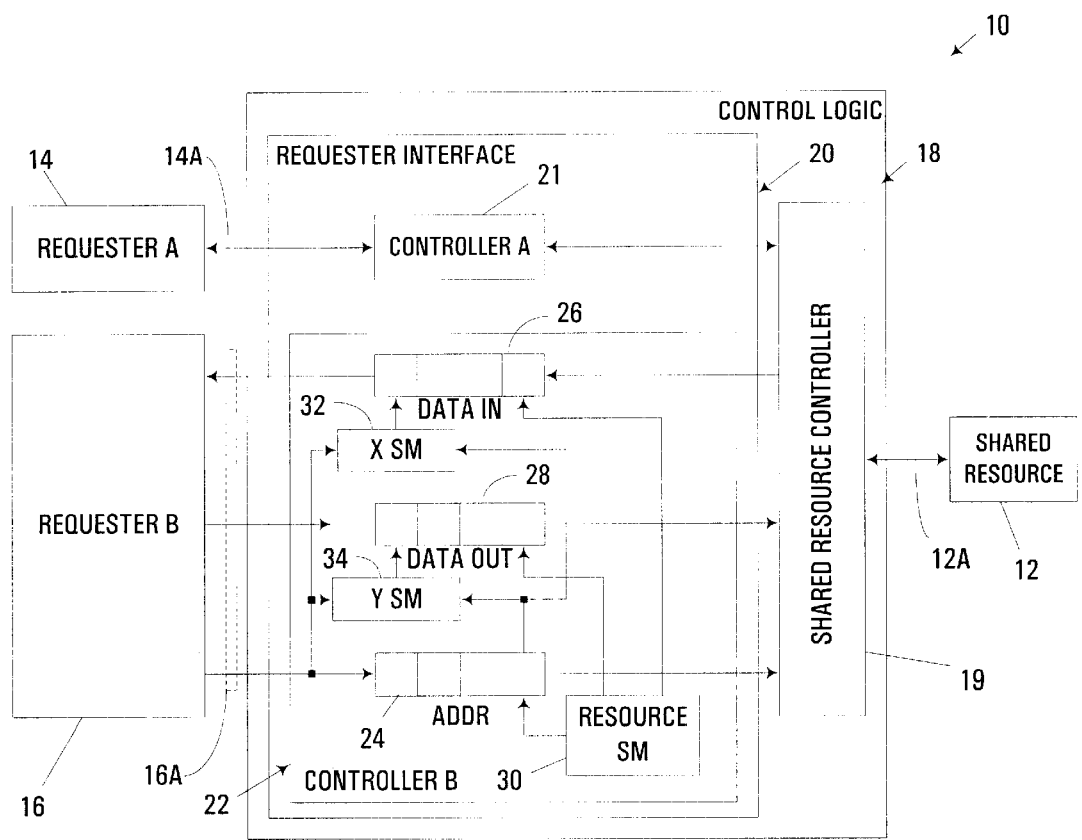
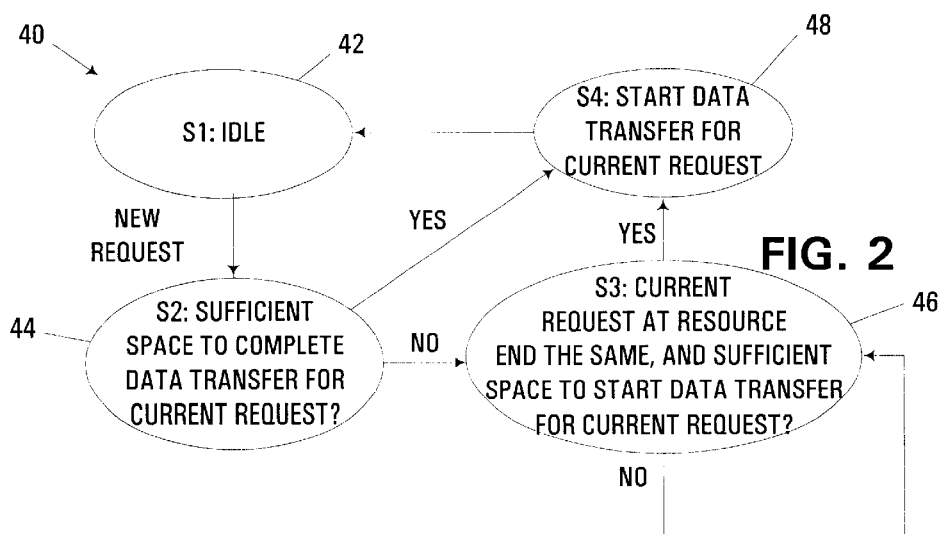

INTERMEDIATE BUFFER CONTROL FOR IMPROVING THROUGHPUT OF SPLIT TRANSACTION INTERCONNECT

FIELD OF THE INVENTION

The invention is generally related to electronic bus architectures and like interconnects, and in particular, to the access of a shared resource such as a memory by multiple requesters using split transactions.

BACKGROUND OF THE INVENTION

As computers and other electronic devices are called upon to handle increasingly difficult tasks, greater and greater performance demands are placed on such devices. Of particular concern in many devices, for example, is the communications speed, or "bandwidth", between interconnected devices, as the speed in which information is transmitted between such devices can have a significant impact on the overall performance of an electronic system.

One manner of coupling multiple electronic devices together is through the use of a "bus", an interconnection that is often used to permit a number of electronic devices to access a shared resource such as a memory. In a bus architecture, every device coupled to a bus receives the signals broadcast on the bus, with only the intended destination device (often indicated by an "address" broadcast over the bus) paying attention to the broadcasted signals. Any non-addressed devices simply ignore the broadcasted signals.

A split transaction bus is a particular form of bus architecture where information transfer is handled using discrete "transactions" issued by requesters, with each transaction including both an address phase and a data phase. During the address phase, typically both the location and size of a data transfer are specified, as well as the type of transaction being performed (e.g., read, write, etc.). For example, the address phase of a transaction might request that a read operation be performed to obtain 16 bytes of information stored at a particular address on a target device. Then, during the data phase, the actual information being requested is transferred from the target device to the requesting device over the bus.

An important characteristic of a split transaction bus is that the address and data phases of a transaction are "split", or demultiplexed, from one another such that the data phase is not required to be performed at any fixed time relative to the address phase. Splitting the address and data phases often improves the performance of a split transaction bus since other productive work can be performed during the time period between the address and data phases of a transaction. For example, it may take two or three bus cycles after receiving an address phase of a transaction for a target device to transmit requested data over the bus. As such, during the interim, other transactions can be initiated over the bus, rather than having the bus stand idle waiting for the requested data to be transferred (a process known as "pipelining"). The maximum performance available from any bus is obtained when useful information is being transmitted on every cycle, and as such, the ability to split transactions can often assist in minimizing the amount of cycles that go unused, and thus maximizing bus efficiency.

One specific application of a split transaction bus is an Accelerated Graphics Port (AGP) bus, which is a high performance interconnect used to transmit graphical data between a graphical accelerator (functioning as a requester) and a system memory (functioning as a shared resource) in a computer. Many graphical applications, in particular 3D applications, have relatively high memory bandwidth requirements, and an AGP bus assists in accelerating the transfer of graphical data in such memory-intensive applications.

AGP buses support a number of different types of transactions, including high priority reads, low priority reads, high priority writes, low priority writes, etc. Transaction requests for each type of transaction (representing the address phases of the transactions) are typically placed on a common request queue, and the requests are ordered in the queue based on predetermined rules. Each transaction type, however, typically has its own data storage area, or "intermediate buffer", within which data is temporarily stored when being transferred between an AGP device and the system memory. Given the split nature of the AGP transactions, the data transfers associated with the requests may be performed in different orders, so long as the data transfers for any single type of access are performed in the specified order.

AGP buses are typically interfaced with a system memory through a memory interface that also handles accesses to the system memory by the main processor for the computer, with arbitration functionality included in the memory interface to manage the processor and AGP accesses to the system memory. In many instances, the system is configured to optimize data transfer between the main processor and the system memory, sometimes to the detriment of the AGP bus. For example, for x86 processor architectures, often the main processor and system memory are configured to process relatively "short" transactions of up to 4 clock cycles in length (where a clock cycle represents the smallest unit of time on a bus). However, many AGP transactions are relatively longer, and thus need to be split up into multiple smaller transactions by the memory interface.

In part due to the highly pipelined nature of both the AGP bus and many memory interfaces, a potential source of inefficiency has been identified, where delays, known as "wait states" may need to be inserted on the AGP bus in certain circumstances. In particular, an AGP device is typically interfaced with a memory using an AGP interface coupled to an AGP bus for use in placing requests on the request queue, and in handling the transfer of data between the AGP device and the various intermediate buffers supported for the different available transaction types. A memory interface in turn pulls requests off of the request queue and handles data transfer between the memory and the intermediate buffers. As a result, with this configuration, the memory interface and the AGP interface are typically handling different requests at any given time.

Conventional AGP implementations permit a write transaction to be started on an AGP bus if there is sufficient space in the intermediate buffer associated with the transaction to hold one block (four clocks worth) of data, even if there is not enough free space to store all of the data to be transferred via the transaction. The AGP 2.0 Specification supports three speeds, 1×, 2× and 4×, with a maximum of 64 bytes of information transmitted in a transaction. Thus, with a 32-bit (4-byte) bus, at 1× speed a maximum of 4 blocks may be required for a transfer, and at 2× speed a maximum of 2 blocks may be required for a transfer. It has been found, however, that if a write access is initiated at the availability of the minimum space required to start the transaction, but without the availability of the minimum space required to complete the transaction, wait states may need to be inserted on the AGP bus to delay activity on the AGP bus until the memory interface has freed enough space in the intermediate buffer to complete the AGP transfer into the intermediate buffer.

During the time that wait states are inserted on an AGP bus, no new AGP request transactions will be started by the AGP interface. This is despite the fact that different types of transactions (e.g., read transactions) could otherwise be performed during this time period. Moreover, this problem is exacerbated due to the need to split long AGP transactions into multiple short transactions to access the memory, since multiple short transactions may need to be issued on the memory interface before space is freed in the associated intermediate buffer.

Waiting to start transferring data associated with a transaction in an intermediate buffer until all of the space necessary to store the data is available is not a desirable alternative, since despite the fact that the aforementioned wait state problem would typically not be a concern, performance would still not be optimal because ordering rules could hold up other transactions.

Conditioning the storage of data associated with a split transaction merely on the amount of space available in an intermediate buffer consequently limits the peak efficiency of a split transaction bus or other interconnect. Therefore, a need exists in the art for improved efficiency in handling transactions on a split transaction bus, in particular for AGP and like applications.

SUMMARY OF THE INVENTION

The invention addresses these and other problems associated with the prior art by providing a circuit arrangement, apparatus and method in which control over the transfer of data into an intermediate buffer, in addition to being conditioned upon the amount of free space in the intermediate buffer, is conditioned upon whether a data transfer request associated with such transfer of data is ready to be processed at a shared resource that is the target for the data transfer request. As such, whenever data awaiting transfer into the intermediate buffer for at least a certain type of data transfer request is associated with a data transfer request that is not yet ready to be processed by a shared resource, data transfer into the intermediate buffer is inhibited, thus freeing an interconnect that feeds the buffer to handle other types of pending transfer requests so that such requests may potentially be completed with reduced latency.

Requiring that data transfers associated with such data transfer requests be ready to be processed by the shared resource increases the probability that such requests will be completed faster and be held for less time since both the requester and the shared resource are processing the same request. As a result, overall throughput is often improved.

In one specific, but not exclusive, application of the invention, data transfer requests represent AGP write transactions to a shared memory, and control logic for an intermediate buffer used to store the write data associated with such transactions is configured to selectively inhibit the storage of write data associated with an AGP write transaction unless both at least one block of free space (representing the minimum amount of space necessary to start the write transaction) exists in the intermediate buffer, and the shared memory is ready to process the transaction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of an apparatus consistent with the invention.

FIG. 2 is a state diagram illustrating the operation of the Y State Machine in the apparatus of FIG. 1.

DETAILED DESCRIPTION

Figure 3:
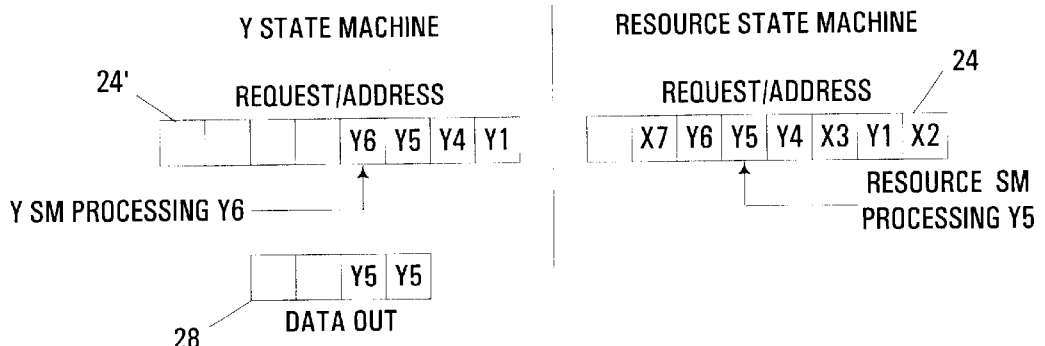
FIGS. 3 and 4 are block diagrams illustrating an exemplary transaction processed by the apparatus of FIG. 1.

Turning to the Drawings, wherein like numbers denote like parts throughout the several views, FIG. 1 illustrates an apparatus 10 incorporating intermediate buffer control consistent with the invention. Apparatus 10 includes a shared resource 12 coupled to a plurality of requesters or initiators 14, 16. Control logic 18, which incorporates a shared resource interface (implemented in FIG. 1 by a controller 19) and a requester interface 20, manages the transfer of data between shared resource 12 and each requester 14, 16.

Shared resource 12 may represent any type of source of information for which shared access is desirable, including, for example, various levels of memory such as main, working or various supplemental levels of memory, as well as various internal or external interconnected devices such as devices coupled over a shared bus, e.g., a peripheral component interconnect (PCI) bus. Shared resource 12 may also represent an information storage system such as a database or mass storage device. The shared resource in this context is typically a "slave" to any number of requesters, each of which functions as a "master" controller capable of issuing requests to access the shared resource.

Each requester may be implemented using any number of resource accessing devices, such as microprocessors and other central processing unit (CPU) devices, as well as various other controllers such as graphics controllers, device controllers, memory controllers, and the like.

In the specific embodiment discussed below, for example, the shared resource may be implemented as the main memory of a computer, with requester 14 being implemented as the CPU of the computer, and requester 16 being implemented as a graphics controller interfaced with the main memory via an Accelerated Graphics Port (AGP) interconnect. However, it will be appreciated that a wide variety of master and slave devices may be utilized to implement the requesters and shared resource of apparatus 10, and as such, the invention is not limited to the particular implementations described herein.

Control logic 18 represents the interface between the plurality of requesters and the shared resource. Communication with the shared resource is provided directly by a shared resource interface, e.g., controller 19, with a requester interface 20 utilized to provide communication with each of requesters 14, 16. Within the requester interface is included a plurality of dedicated controllers, e.g., controllers 21, 22, which are respectively dedicated for interfacing with requesters 14, 16.

Communication with shared resource 12 is provided over a shared resource bus 12a, and communication with each of requesters 14, 16 is likewise provided by requester buses or interconnects 14a, 16a, respectively. It will be appreciated that the interconnects between control logic 18 and the shared resources and requesters may be implemented using any number of interconnect technologies, including pointto-point or multi-drop buses or other interconnects, and that individual requesters may share the same interconnect in some circumstances. It should therefore be appreciated that the usage of the term "bus" can incorporate any number of different interconnect technologies consistent with the invention.

While control logic 18 in the illustrated embodiment utilizes controllers to manage communication with the requesters and shared resources, it will be appreciated that this functionality may be handled by other types of control logic, and so the term "controller" should be understood to encompass any control logic suitable for managing communication of a bus or other interconnect. In addition, while control logic 18 has been represented through the use of individual controllers interfaced with one another to provide access to each requester and shared resource, it will be appreciated that the functionality allocated amongst these various controllers may be partitioned differently in other environments.

Furthermore, it should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith. It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

For the purposes of better illustrating intermediate buffer control consistent with the invention, it will be assumed that bus 16a is implemented as a split transaction bus, and that it is within controller 22 that intermediate buffer control consistent with the invention is implemented. As such, the discussion hereinafter will focus on requester controller 22. It may be assumed for the purposes of this specific implementation that controllers 19 and 21 may be implemented in a conventional manner. Furthermore, in some embodiments neither bus 12a nor bus 14a would need to be configured to support split transactions.

It will be appreciated, however, that the hereindescribed functionality may also be utilized in providing an interface with other requesters or with the shared resource, as well as for controlling other intermediate buffers within controller 22. Therefore, the invention is not limited to the particular embodiment shown in FIG. 1.

Controller 22 incorporates a request buffer 24, a data in buffer 26 and a data out buffer 28. Request buffer 24 is used to store the address phase of split transactions to be processed by the controller, and may be implemented using a queue or other suitable data structures. Incoming requests from requester 16 are automatically received by the controller and placed on request buffer 24. Resource control logic 30, implemented here as a resource state machine, controls the output of such requests to the shared resource controller 19 for forwarding to the shared resource. Resource control logic 30 further controls the resource "end" of each data buffer 26, 28, as will be discussed in greater detail below.

In the illustrated embodiment, separate data paths are provided for incoming and outgoing data. Such data paths respectively incorporate data buffers 26, 28. In particular, data in buffer 26 represents an intermediate buffer used to store incoming data received from the shared resource in response to a request, e.g., in response to a read request initiated by requester 16 to retrieve data stored in the shared resource. Resource control logic 30 is coupled to data in buffer 26 to control the storage of data received from the shared resource in the buffer. Forwarding of such data to the requester over bus 16a once such data is stored in the buffer is controlled via data in control logic 32, implemented in the illustrated embodiment as a state machine, also referred to as the "X" state machine. Data in control logic 32 receives as input the address information sent by requester 16, as well as the address information stored at the resource end of request buffer 24, which respectively provide an indication of which request is being processed on the requester bus 16a, and which request is ready to be processed by the shared resource.

Data out buffer 28 also functions as an intermediate buffer for use in forwarding data from requester 16 to shared resource 12, e.g., in response to a write request issued by the requester to store data in the shared resource. The forwarding of data already stored in buffer 28 to the shared resource is controlled by resource control logic 30. The storage of data in data buffer 28, on the other hand, is controlled via data out control logic 34, which like control logic 32 receives as input the address information provided by requester 16, as well as the indication of the current request that is ready to be processed by the shared resource, provided from the resource end of request buffer 24. It is within control logic 34 that intermediate buffer control consistent with the invention is implemented in apparatus 10.

Each of buffers 26 and 28 may be implemented as queues. Other data structures may also be used in the alternative. Moreover, each of buffers 24–28 may have different sizes depending on the environment.

In the illustrated embodiment, therefore, read requests are handled in interface 22 by the combination of control logic 30 and 32, whereby the addressing information associated with a read request is forwarded by the requester to request buffer 24, and the forwarding of such a request to the shared resource is controlled via control logic 30. Then, during the data phase of the request, incoming data from the shared resource is controllably stored in intermediate data in buffer 26 by control logic 30, with the forwarding of such information to the requester over bus 16a ultimately controlled by control logic 32.

For write requests, on the other hand, the address phase of such a request is forwarded to the common request buffer 24, with the issuance of such a request to the shared resource controlled by control logic 30. The forwarding of write data to the shared resource is controlled by the combination of control logic 30 and 34, with control logic 34 controlling the storage of write data into the intermediate data out buffer 28, and with control logic 30 controlling the forwarding of such data onto the shared resource.

Consistent with the invention, data out control logic 34 controls the storage of write data into intermediate buffer 28 in such a manner to minimize the likelihood of wait states being required on requester bus 16a due to the inability to store data in intermediate buffer 28. FIG. 2, for example, illustrates a state diagram 40 representing one suitable control algorithm for control logic 34. Control logic 34 may be implemented using four states 42, 44, 46 and 48, also designated in FIG. 2 as states S1–S4. State S1 represents an idle state, which occurs whenever no write requests are currently pending for storage in intermediate buffer 28. Upon the receipt of a new write request, a state transition occurs to state S2, where it is determined whether sufficient space exists in the intermediate buffer to complete the current request—that is, whether there is sufficient space to store all of the data associated with the request in the intermediate buffer. Typically, the determination in state S2 is performed by comparing the amount of data associated with the current request (obtained from the address phase of the request) and the known available space within the intermediate buffer.

Assuming first that insufficient space is available in the buffer to complete a current request, a state transition occurs to state S3 to determine whether the current request being processed at the resource end of the request buffer 24 is the same as the current request being processed at the requester end. In addition, it is determined whether sufficient space exists in the intermediate buffer to start the current request. The state machine will remain in state S3 until both of such conditions are satisfied. Then, once both conditions have been satisfied, a state transition occurs to state S4 to start the data transfer for the current request—that is, to initiate the process of transferring the write data associated with the request into the intermediate buffer. In addition, returning to state S2, if sufficient space is available in the intermediate buffer to complete the current request, a state transition may occur directly to state S4 to start the data transfer for the current request. Once data transfer is started, a state transition occurs back to S1.

The amount of space necessary to start and complete a current request typically varies in different environments, with the amount of space required to start a request typically being less than that required to complete the request. In an AGP environment, for example, typically the minimum amount of space in an intermediate buffer required to start an AGP transaction is one block's worth of data, while the amount required to complete the AGP transaction will vary depending upon the access mode being utilized, typically as many as four block's worth of data in 1X mode. In other environments, however, the relative space requirements may vary.

Returning briefly to FIG. 1, the configuration of resource control logic 30 for use in forwarding address and write data to the shared resource should be well understood by one of ordinary skill in the art. For example, in an AGP implementation, the implementation of control logic 30 may be performed in accordance with the known AGP specification. Likewise, in many environments, e.g., the AGP environment, control logic 32 typically does not require the unique intermediate buffer control algorithm discussed herein, as the data emanating from the shared resource is typically capable of being processed immediately by the requester, and as such can be placed on the requester bus as soon as it is received. However, in some embodiments, this may not be the case, and as such, similar buffer control functionality may be implemented in control logic 32 as well. Also, if additional request types are separately handled via additional intermediate buffers (e.g., other types of write requests such as high or low priority requests), similar control functionality may also be used to control the intermediate buffers therefor as well.

It will be appreciated that the control algorithm represented by states S1–S4 may be modified consistent with the invention. As an example, state S2 may be omitted in some embodiments.

Figure 4:
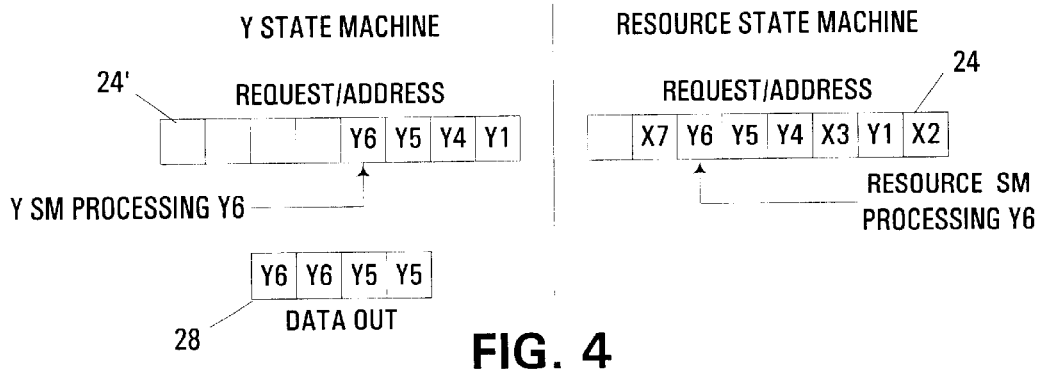

FIGS. 3 and 4 next illustrate the processing of exemplary requests by apparatus in a manner consistent with the invention. FIG. 3, for example, illustrates exemplary contents of request buffer 24 and intermediate buffer 28 at a particular point in time, with request buffer 24 having a number of pending requests Y1, X2, X3, Y4, Y5, Y6 and X7, with requests of type "Y" being write requests and requests of type "X" being read requests. From the perspective of the resource state machine (control logic 30 of FIG. 1), both the "Y" and "X" requests are illustrated. For ease of understanding, an alternate representation 24' of the request buffer is shown from the perspective of the Y state machine (control logic 34 of FIG. 1), showing only the ordering of "Y" type requests. Also, for the purposes of this example, intermediate buffer 28 is shown having currently stored therein data associated with request Y5, with two free blocks of data storage.

It is also assumed in this example that the resource state machine is currently processing request Y5, while the Y state machine is currently processing request Y6. Assume first that the current request Y6 has been received, and as such, the Y state machine transitions from state S1 to S2. Assume also, for example, that request Y6 requires four blocks of space in intermediate buffer 28. As such, state S2 would determine that insufficient space exists in the intermediate buffer to complete the request, and a transition would occur to state S3. Otherwise, if request Y6 only required two or fewer blocks of space in the intermediate buffer, a direct transition from state S2 to state S4 could be made, with the data associated with the request immediately transferred into the intermediate buffer.

Assume also, for the purposes of example, that at least one block of space is necessary in the intermediate buffer to start the transfer of data into the buffer. However, as shown in FIG. 3, given that the resource state machine is processing a different request than the Y state machine (representing that the current request being processed by the Y state machine is not ready to be processed by the shared resource), the Y state machine will remain in state S3. Then, as shown in FIG. 4, once the resource state machine begins processing request Y6, a transition will occur to state S4 to initiate the transfer of data into the intermediate buffer (here, the first two blocks of data associated with request Y6).

It will be appreciated that, while the Y state machine remains in state S3, "X"-type requests may continue to be processed by the other control logic in the interface, e.g., so that read data coming from the shared resource can be forwarded to the requester over bus 16a, thereby maximizing the utilization of the requester bus while the processing of the "Y" request has been stalled. In addition, new requests may also continue to be forwarded from the requester to the request buffer.

Figure 5:
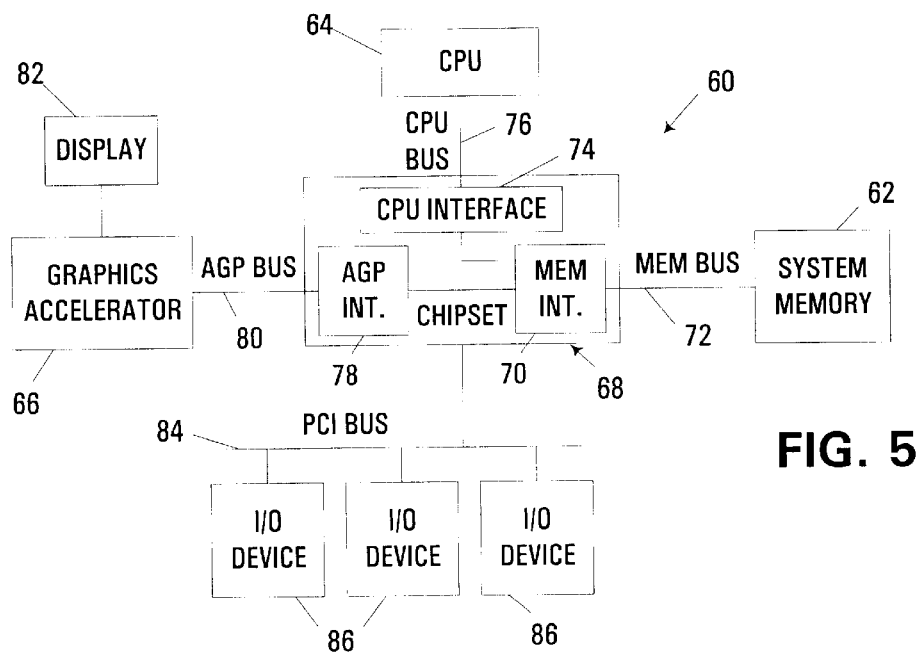
FIG. 5 is a block diagram of an alternate apparatus consistent with the invention, and incorporating an Accelerated Graphics Port (AGP) interface.

As discussed above, one particularly desirable application of the invention is in interfacing a graphics accelerator with a system memory over an Accelerated Graphics Port (AGP) interconnect. FIG. 5, for example, illustrates a computer 60 including a system memory 62 interfaced with a CPU 64 and a graphics accelerator 66 by a chip set 68. The chip set 68 includes a memory interface 70 providing communication with system memory 62 over a memory bus 72. Likewise, chip set 68 includes a CPU bus 74 which interfaces the chip set with CPU 64 over a CPU bus 76. An AGP interface 78 interfaces the chip set with graphics accelerator 66 over an AGP bus 80. The graphics accelerator 66 is utilized to drive a display 82 such as a CRT, an LCD panel or other display. In addition, chip set 68 is also configured to provide an interface to a PCI bus 84 including a plurality of accessible I/O devices 86.

In the embodiment of FIG. 5, therefore, chip set 68 represents the "north bridge" functionality for computer 60. Each of memory bus 72 and CPU bus 76 typically incorporates short (four clocks or less) split transactions. Consistent with the AGP specification, however, AGP bus 80 is capable of initiating transactions that are greater than four clocks in length.

Moreover, memory interface 70 functions analogous to a shared resource controller, while CPU interface 74 functions as a dedicated requester interface for CPU 64, which functions as a requester. AGP interface 78 represents the requester interface to graphics accelerator 66, which also functions as a requester in the context of the invention. It is within AGP interface 78 that the unique intermediate buffer control discussed herein may be implemented. As such, the requests in this implementation take the form of AGP-compatible transactions, e.g., write transactions. Moreover, different types of AGP transactions (e.g., low and high priority write transactions) may be handled separately, and as such, dedicated intermediate buffers and associated control logic may be provided for multiple types of transactions handled by the AGP interface.

It will be appreciated that the implementation of the herein-described buffer control functionality in AGP interface 78 would be within the ability of one of ordinary skill in the art having the benefit of the instant disclosure. It will also be appreciated, however, that the invention has applicability in environments other than AGP-based systems.

Various modifications may be made to the illustrated implementations without departing from the spirit and scope of the invention. Therefore, the invention lies in the claims hereinafter appended.

What is claimed is:

1. A circuit arrangement, comprising:
   (a) a requester interface configured to receive a plurality of data transfer requests from a plurality of requesters, a first data transfer request among the plurality of data transfer requests associated with a first requester among the plurality of requesters;
   (b) a shared resource interface configured to forward the data transfer requests received by the requester interface to a shared resource;
   (c) an intermediate buffer configured to receive data associated with the first data transfer request from the first requester in response to the first data transfer request and thereafter forward the data to the shared resource; and
   (d) intermediate buffer control logic, coupled to the intermediate buffer, the intermediate buffer control logic configured to inhibit a transfer of data associated with the first data transfer request from the first requester to the intermediate buffer until the first data transfer request is ready to be processed at the shared resource and a predetermined amount of space is available in the intermediate buffer.

2. The circuit arrangement of claim 1, wherein the requester interface includes a plurality of requester controllers, each requester controller configured to interface one of the plurality of requesters with the shared resource interface.

3. The circuit arrangement of claim 1, wherein the requester interface comprises:
   (a) a request buffer configured to receive data transfer requests from the first requester; and
   (b) request buffer control logic, coupled to the request buffer, the request buffer control logic configured to forward data transfer requests from the request buffer to the shared resource interface;
   wherein the intermediate buffer control logic is further coupled to the request buffer to determine when the first data transfer request is ready to be processed at the shared resource.

4. The circuit arrangement of claim 3, wherein the intermediate buffer control logic is configured to transfer the data associated with the first data transfer request to the intermediate buffer when the first data transfer request is ready to be processed at the shared resource and the predetermined amount of space is available in the intermediate buffer, and wherein the request buffer control logic is coupled to the intermediate buffer to initiate transfer of the data associated with the first data transfer request from the intermediate buffer to the shared resource.

5. The circuit arrangement of claim 3, wherein each of the intermediate and request buffers comprises a queue.

6. The circuit arrangement of claim 1, wherein the intermediate buffer control logic is further configured to transfer the data associated with the first data transfer request to the intermediate buffer regardless of whether the first data transfer request is ready to be processed at the shared resource if a second predetermined amount of space, greater than the first predetermined amount of space, is available in the intermediate buffer.

7. The circuit arrangement of claim 6, wherein the first predetermined amount of space includes a minimum amount of space required to store a portion of the data associated with the first data transfer request, and wherein the second predetermined amount of space includes a minimum amount of space required to store all of the data associated with the first data transfer request.

8. The circuit arrangement of claim 7, wherein the first data transfer request comprises an Accelerated Graphics Port (AGP) write transaction, and wherein the first predetermined amount of space includes an AGP block.

9. The circuit arrangement of claim 1, wherein the shared resource interface is coupled intermediate the intermediate buffer and the shared resource to receive data forwarded by the intermediate buffer to the shared resource, and forward such data to the shared resource.

10. An integrated circuit device comprising the circuit arrangement of claim 1.

11. A data processing system comprising the circuit arrangement of claim 1.

12. A program product, comprising a hardware definition program defining the circuit arrangement of claim 1, and a signal bearing medium bearing the hardware definition program.

13. An apparatus, comprising:
(a) a shared resource;
(b) a plurality of requesters, each configured to generate data transfer requests to access the shared resource, the plurality of requesters including a first requester configured to generate a first data transfer request;
(c) a request buffer configured to receive data transfer requests from the first requester and forward such data transfer requests to the shared resource;
(c) an intermediate buffer configured to receive data associated with the first data transfer request from the first requester in response to the first data transfer request and thereafter forward the data to the shared resource; and
(d) intermediate buffer control logic, coupled to the intermediate buffer, the intermediate buffer control logic configured to inhibit a transfer of data associated with the first data transfer request from the first requester to the intermediate buffer until the first data transfer request is ready to be processed at the shared resource and a predetermined amount of space is available in the intermediate buffer.

14. An apparatus, comprising:
(a) a shared memory coupled to a memory bus and configured to process transactions having a first length;
(b) a processor coupled to a processor bus and configured to issue transactions having the first length;
(c) an Accelerated Graphics Port (AGP) requester coupled to an AGP bus and configured to issue transactions having a second length that is longer than the first length; and
(d) a chipset coupled to the memory, processor and AGP buses, the chipset comprising:
  (1) an AGP interface coupled to the AGP bus;
  (2) a processor interface coupled to the processor bus;
  (3) a shared memory interface coupled to the memory bus;
  (4) a request buffer configured to receive transactions from the AGP bus;
  (5) an intermediate buffer configured to receive data associated with transactions received from the AGP bus;
  (6) request buffer control logic, coupled to the request buffer, the request buffer control logic configured to forward transactions stored on the request buffer to the shared memory interface when the transactions are ready to be processed by the shared memory; and
  (7) intermediate buffer control logic, coupled to the intermediate buffer, the intermediate buffer control logic configured to transfer the data associated with a first transaction received from the AGP bus into the intermediate buffer if either (i) sufficient space exists in the intermediate buffer to complete the first transaction, or (ii) sufficient space exists in the intermediate buffer to start the first transaction and the first transaction is ready to be processed by the shared memory.

15. A method of interfacing a shared resource with a plurality of requesters, the method comprising:
(a) receiving a plurality of data transfer requests from the plurality of requesters, a first data transfer request among the plurality of data transfer requests associated with a first requester among the plurality of requesters;
(b) forwarding the data transfer requests to the shared resource;
(c) inhibiting a transfer of data associated with the first data transfer request from the first requester to an intermediate buffer until the first data transfer request is ready to be processed at the shared resource and a predetermined amount of space is available in the intermediate buffer; and
(d) forwarding data stored in the intermediate buffer to the shared resource.

16. The method of claim 15, further comprising transferring the data associated with the first data transfer request to the intermediate buffer when the first data transfer request is ready to be processed at the shared resource and the predetermined amount of space is available in the intermediate buffer.

17. The method of claim 15, further comprising transferring the data associated with the first data transfer request to the intermediate buffer regardless of whether the first data transfer request is ready to be processed at the shared resource if a second predetermined amount of space, greater than the first predetermined amount of space, is available in the intermediate buffer.

18. The method of claim 17, where in the first predetermined amount of space includes a minimum amount of space required to store a portion of the data associated with the first data transfer request, and wherein the second predetermined amount of space includes a minimum amount of space required to store all of the data associated with the first data transfer request.

19. The method of claim 18, wherein the first data transfer request comprises an Accelerated Graphics Port (AGP) write transaction, and wherein the first predetermined amount of space includes an AGP block.

* * * * *